(12) United States Patent
Szilagyi

(10) Patent No.: US 10,027,255 B2
(45) Date of Patent: Jul. 17, 2018

(54) SLOPE-FOLLOWING PRECISION DRIVE

(71) Applicant: Microcosm, Inc., Hawthorne, CA (US)

(72) Inventor: Andrei Szilagyi, Rancho Palos Verdes, CA (US)

(73) Assignee: MICROCOSM, INC., Torrance, CA (US)

(*) Notice: Subject to any disclaimer, the term of this patent is extended or adjusted under 35 U.S.C. 154(b) by 321 days.

(21) Appl. No.: 14/214,283

(22) Filed: Mar. 14, 2014

(65) Prior Publication Data

US 2014/0298950 A1   Oct. 9, 2014

Related U.S. Application Data

(60) Provisional application No. 61/786,220, filed on Mar. 14, 2013.

(51) Int. Cl.
| | |
|---|---|
| *H01L 41/09* | (2006.01) |
| *H02N 2/10* | (2006.01) |
| *H02N 2/00* | (2006.01) |
| *G02B 7/183* | (2006.01) |

(52) U.S. Cl.
CPC .......... *H02N 2/103* (2013.01); *H02N 2/0055* (2013.01); *G02B 7/183* (2013.01); *Y10T 74/2107* (2015.01)

(58) Field of Classification Search
CPC ............................ H02N 2/103; H02N 2/0055
USPC ................................ 310/323.01–323.19, 328
See application file for complete search history.

(56) References Cited

U.S. PATENT DOCUMENTS

| | | | | | |
|---|---|---|---|---|---|
| 4,764,702 | A * | 8/1988 | Mishiro | ................. | H02N 2/106 310/323.12 |
| 5,424,597 | A * | 6/1995 | Gloss | ................. | H02N 2/021 310/328 |
| 5,532,540 | A * | 7/1996 | Claeyssen | ................. | H02N 2/001 310/323.16 |
| 5,682,076 | A * | 10/1997 | Zumeris | ................. | G11B 7/08576 310/366 |
| 5,714,833 | A * | 2/1998 | Zumeris | ................. | G11B 5/5552 310/328 |
| 5,726,520 | A * | 3/1998 | Grahn | ................. | A61F 2/68 310/323.02 |
| 5,986,383 | A * | 11/1999 | Hasuda | ................. | H02N 2/004 310/317 |
| 6,617,759 | B1 * | 9/2003 | Zumeris | ................. | H01L 41/0913 310/323.01 |
| 7,199,507 | B2 * | 4/2007 | Ganor | ................. | B26B 19/28 310/323.02 |

(Continued)

*Primary Examiner* — Thomas Dougherty
(74) *Attorney, Agent, or Firm* — Noel F. Heal

(57) ABSTRACT

Apparatus, and a corresponding method for its operation, for precisely moving a movable rotor by urging a motor, such as a piezoelectric motor, into operative engagement with a circumferential rim-like portion of the rotor, with a radial preload force great enough to produce tangential motion in the rim-like portion and thereby to move the rotor in any desired manner and with very high precision. Possible damaging effects of the radial preload force are canceled by the introduction of an oppositely directed radial resistive force, such as by means of one or more pinch rollers positioned opposite the motor and also engaging the rim-like member. The motor is mounted in an assembly that permits limited sliding and pivoting movements of the motor and thereby allows the motor to adapt to any physical irregularities in the driven rim-like member.

6 Claims, 7 Drawing Sheets

(56) References Cited

U.S. PATENT DOCUMENTS

| | | | | |
|---|---|---|---|---|
| 7,687,973 B2* | 3/2010 | Oki | ............... | G11B 5/5569 |
| | | | | 310/323.02 |
| 2002/0067105 A1* | 6/2002 | Kosaka | ............ | H02N 2/163 |
| | | | | 310/323.16 |
| 2010/0038995 A1* | 2/2010 | Claeyssen | .......... | H02N 2/025 |
| | | | | 310/323.02 |
| 2013/0140952 A1* | 6/2013 | Kamijo | ............ | H01L 41/09 |
| | | | | 310/328 |

* cited by examiner

FIG. 7
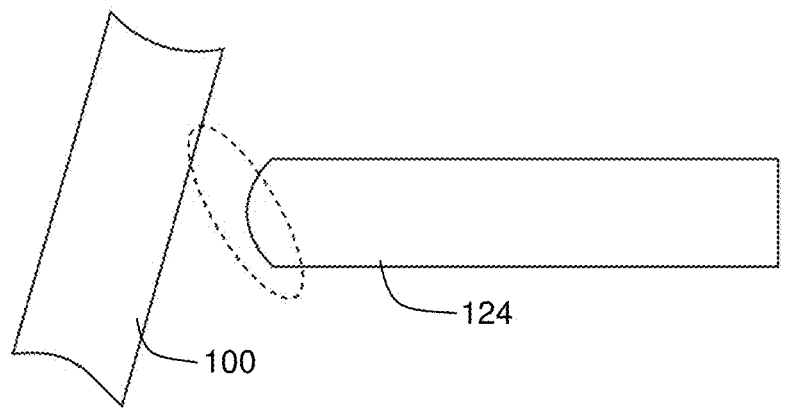
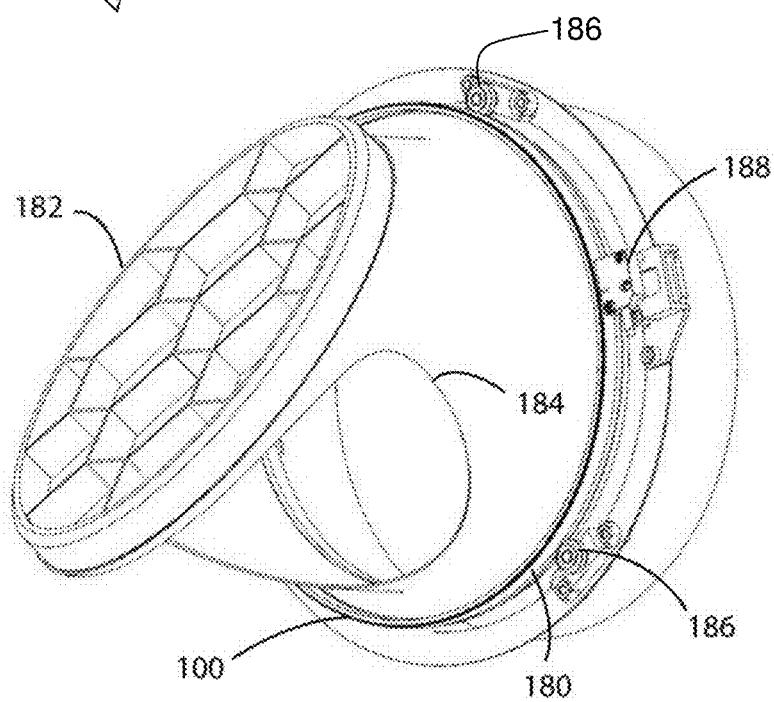
FIG. 8

SLOPE-FOLLOWING PRECISION DRIVE

CROSS REFERENCE TO RELATED APPLICATION

This application claims the benefit of Provisional Patent Application No. 61/786,220, filed Mar. 14, 2013, the entirety of which is hereby incorporated by reference into this application.

BACKGROUND OF THE INVENTION

This invention relates generally to the field of precision movement control and, more particularly, to the use of ultrasonic motors for movement control.

The support and driving of moving objects forms the subject of a very large body of technical art. As the field has matured, the focus of advancements has gradually shifted to such beneficial system attributes as smoothness of motion, suppression of vibration, longevity of moving parts, tolerance of manufacturing imperfections, low weight and low cost. Of these, the first three attributes (smooth motion, vibration suppression and moving part longevity) tend to be achieved at the detriment of the last three (manufacturing imperfections, weight and cost). For example, longevity often is associated with a smooth, vibration free motion such as can be obtained using precision bearings and other expensive components. Conversely, the use of low cost or light weight parts may lead to shortened operating life and a rough ride that may be incompatible with sensitive payloads.

The elements of a motorized system essential to the present invention are the following:
1) Stator or support
2) Motor or actuator
3) Rotor or driven member
4) Coupling means between motor and stator (e.g. fasteners or springs)
5) Coupling means between rotor and motor (e.g. gears or friction tips)
6) Optional coupling means between rotor and stator (e.g. bearings)

Coupling among these various elements often involves some form of preload, particularly when manufacturing imperfections are expected and when the avoidance of backlash or loss of control is desired. In the case of a friction drive system, a preload between motor and rotor is inherently required in order to achieve the desired frictional coupling. The preload frequently affects the stresses, and the effectiveness and durability of the bearings supporting the rotor. In its turn, design and manufacturing imperfections in the bearings affect the quality of the movement. The same preload can also induce deformation in both moving and stationary structures. The deformation can be elastic (temporary), plastic (permanent), or some combination of elastic and plastic. In any of those cases, such deformation is accompanied by dynamic loads that are frequency dependent, leading to mechanical vibration, acoustic noise, limitations of operating speed and premature failure. These effects are, of course, not limited to a friction drive, but can be found in any coupling application where the motor preload is transmitted through a compliant structure to a bearing.

U.S. Pat. No. 7,199,507 issued in the names of Ganor et al., and particularly FIG. 1A of this patent, 1 illustrates this well known prior art configuration in the case of a friction drive where the preload is applied radially. The rotor of this example is configured as a relatively thin shell. Although such a thin shell saves material and cost, its slenderness subjects it to the risk of deformation, increased vibration and a shortened life. Other prior art examples might opt for a thicker rotor, or even a solid rotor, in order to avoid such undesirable side effects. The effects discussed above also apply if the preload is applied in an axial direction, as seen in the prior art example of U.S. Pat. No. 5,682,076 issued in the name of Zumeris, and particularly FIG. 14C of that patent.

A number of approaches to mitigate such unwanted side effects are commonly found in the art, as summarized in Table 1:

TABLE 1

| Mitigation approach | Tradeoff/penalty |
| --- | --- |
| Operation under reduced load | Reduced performance |
| Operation at lower speed | Reduced performance |
| Use of stiffer components | Higher cost/weight |
| Use of higher quality components | Higher cost |

As can be seen in Table 1, the mitigation approaches most commonly found carried with them significant penalties. More recently, additional approaches have been introduced to improve unintended tradeoffs (Table 2).

TABLE 2

| Additional mitigation approaches | Tradeoff/penalty |
| --- | --- |
| Symmetrical motor arrangement relieves load on rotor bearings (As in U.S. Pat. No. 5,714,833) | Added motor cost<br>Increased driving complexity<br>Bearing and motor contact over-constrain the rotor: compliance/preload still needed to accommodate part and assembly imperfections<br>Performance limited by driven member surface accuracy |
| Symmetrical motor arrangement supports rotor without bearings (As in Pat. No. 7,687,973) | Added motor cost<br>Increased driving complexity<br>Diminished load carrying capacity<br>Compliant rotor mounted in deformed state limits speed and operating life<br>Performance limited by driven member surface accuracy |
| Symmetrical arrangement of motors and idlers provides a lower cost method of relieving load on moving member supports (As in Pat. Nos. 6,617,759 and 5,424,597) | Compliant rotor mounted in deformed state limits speed and operating life<br>One sided driving results in center of mass movement, reduced resonant frequency and more vibration<br>Performance limited by driven member surface accuracy |
| Counter roller carried by motor assembly removes motor preload from load presented by moving member (As in Pat. No. 5,682,076) | Complex, two-active element motor used to secure consistent relationship of motor to relatively moving part<br>Motor complexity<br>Kinematic load variations due to non-ideal shape or surface conditions not provided for<br>Payload supported by weak contact points |

For instance, a symmetric arrangement of preloaded motors, as shown in FIG. 31B of U.S. Pat. No. 5,714,833, could substantially remove the portion of the bearing stresses due to the motor. Moreover, in the case of a light payload such as a hard drive read head, the bearing could be eliminated entirely by having the rotor completely supported by the motors themselves, as taught by U.S. Pat. No. 7,687,973, and particularly FIG. 6A of that patent. Symmetrically pressing against a driven member was broadened to include both active motors and passive, or idling, rollers, as taught in U.S. Pat. No. 6,617,759, and particularly FIG. 3 of that patent. A similar approach is taught in U.S. Pat. No. 5,424,597 issued in the names of Gloss et al.

As also disclosed by Zumeris in the aforementioned U.S. Pat. No. 5,682,076, and particularly in FIG. 21 of that patent, a counter-roller could be introduced, which would balance the preload locally. Mounting the counter roller onto the same structure as the motor was a significant advancement since it allowed maintenance of the preload value throughout the available range of motion without risk of denting the engaged surface, at least for the case of the motor assembly being the travelling element. In spite of that advancement, certain limitations have persisted. According to the '076 patent specification, the embodiment of its FIG. 21 could be operated with either the motor or the engaged member being the travelling element. In the figure, it is the motor with its housing that are allowed to travel. Although this arrangement is clearly possible, it is not very advantageous for the following reasons:

In normal operation, the payload and the motor are supported by contacts between the motor and a relatively thin engaged body, on the one hand, and between ceramic spacers and a counter roller/bearing on the other hand. The amount of payload that can be carried is thus limited by the mechanical strength of the piezoelectric ceramic, a material known to be relatively brittle.

In addition, since the motor requires a source of power, its travel range is limited by the length of wire, cable or flexible circuitry that can be carried by the moving motor. Alternatively, if a battery is chosen as the source of power, the payload capacity must be reduced by the mass of the battery and associated electronics. This limitation, of course, is shared by any "locomotive" type of transport.

Another mode of operation of the invention disclosed in U.S. Pat. No. 5,682,0767 envisions the motor to be stationary. In this mode certain limitations remain, as well: First, as in the other mode, the payload is supported by the contacts between the engaged body, on the one hand, and the ceramic spacers and counter roller/bearing on the other hand. The amount of payload that can be carried is thus limited by the mechanical strength of the piezoelectric ceramic, a material known to be relatively brittle. No other means of supporting the payload is provided. Second, as the driven member advances through its range of motion, a variable torque would accompany the change in payload moment arm length. In turn the mechanical load presented to the two piezoelectric elements would vary in an imbalanced way, thus further reducing the payload capacity.

A further limitation, which applies to either of its modes of operation, is that constructing the motor with two active piezoelectric vibrators essentially doubles the complexity and cost, as well as the probability of failure of the motor.

Although the approaches of the prior art described above have enabled remarkable performance improvements, the widespread growth of applications with demanding movement specifications continues to be hampered by the cost of high precision driven members such as ceramic rotors and sliders. Accordingly, it is a general object of the present invention to overcome the aforementioned shortcomings and limitations while retaining the known benefits of the existing art. It is a particular object of the invention to provide an apparatus for coupling between a motor and a driven member, said apparatus which maximizes positive system attributes such as motion smoothness and tolerance to component imperfections, while minimizing negative attributes such as high cost, weight and sensitivity to the deterioration of components under stress. It is a further particular object of the invention to provide a method of coupling a motor and a reduced-cost driven member, such that the effects of bearing loads, system weight, sensitivity to component imperfections and cost are minimized while stiffness in the direction receiving the motive force is maximized. Yet another object of this invention is to provide a low cost, high performance, rotation stage.

It will be appreciated from the foregoing that there is still a significant need for a method and related apparatus for precisely controlling the movements of a driven member, which may have imperfections arising from manufacture, wear, or simply poor quality, with a drive motor and an associated coupling mechanism, in such a way as to achieve a high level of positioning performance without the burdens of increased cost and weight normally associated with that level of performance. The present invention satisfies this need and has other aspects advantages that will be discussed in the following summary.

BRIEF SUMMARY OF THE INVENTION

Briefly, and in general terms, the present invention resides in a slope-following drive apparatus and a method for its operation, the apparatus comprising a shell-like driven member having a driven surface that lacks dimensional uniformity, a slope-following motor assembly for driving the driven member to a desired position, and a stator for supporting the driven member and the motor assembly, wherein the motor assembly and the driven member are coupled together such that the motor assembly can drive the driven member precisely and without imparting any net normal force to the driven member. The motor assembly adapts to irregularities in the driven surface and is substantially immune to its lack of dimensional uniformity.

In its broadest terms, the method of the invention comprises the steps of coupling the motor assembly to the driven surface of the shell-like body, coupling the motor assembly to the stator through a motor support structure that adapts to slope changes in the driven surface, and energizing the motor assembly to urge the driven surface of the shell-like body to move in a direction generally tangential to the driven surface.

Other aspects and advantages of the invention will become apparent from a more detailed description, following a brief description of the several views of the drawings.

BRIEF DESCRIPTION OF THE SEVERAL VIEWS OF THE DRAWINGS

FIG. 7 is a schematic view similar to FIGS. 6A-6C but showing both angular and radial position errors of the motor with respect to the rotor.

FIG. 8 is an exterior perspective view of an optical scanning assembly embodying the principles of the invention as described with reference to FIGS. 1-7.

DETAILED DESCRIPTION OF THE INVENTION

Figure 1:
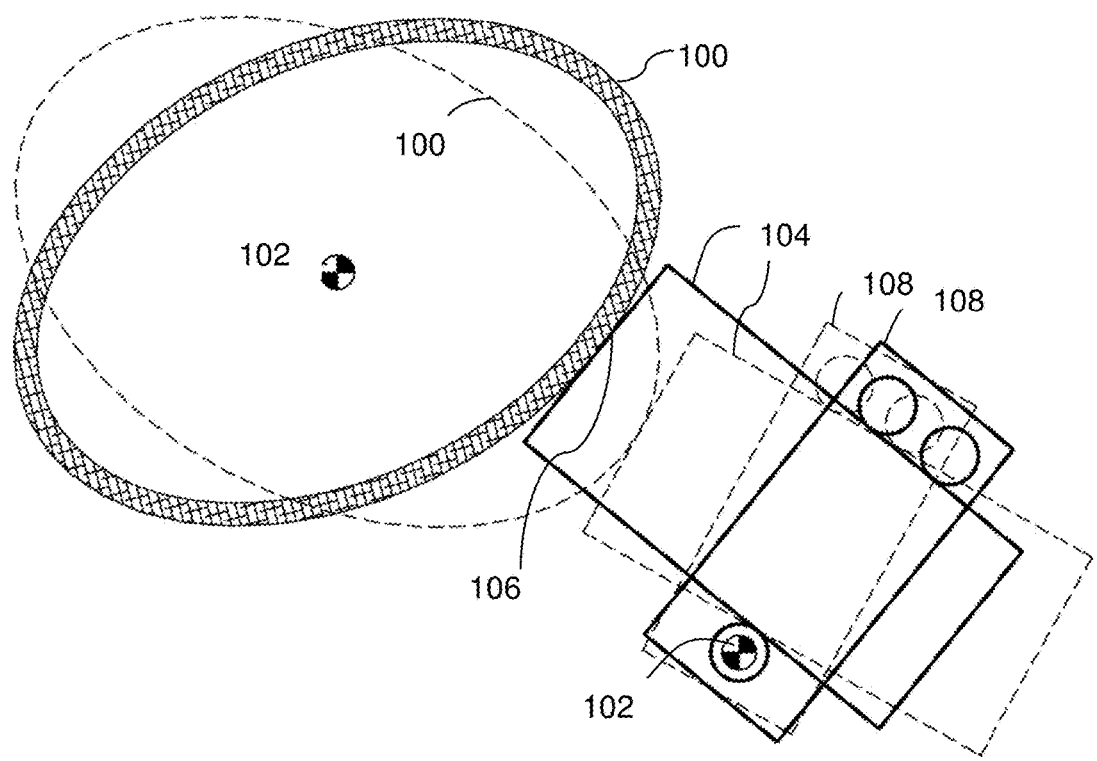
FIG. 1 is a schematic view of a slope-following drive shown at two different phases of rotation of a rotor, which is shown as having a purposely exaggerated non-circular cross-section.

As shown in the drawings, the present invention resides in a method and apparatus for moving a substantially shell-like body in a direction tangential to a driven surface of the shell-like body without imparting a net force perpendicular to the driven surface. The apparatus includes a motor module and a coupling mechanism that couples the motor assembly to the driven surface. The motor module is mounted in a way that permits sliding and pivoting motions that allow the motor module to adapt to irregularities in the driven surface, while the motor module urges the shell to move as desired in a direction tangential to the driven surface. The coupling mechanism applies a preload force to maintain contact between the motor module and the driven surface, but balances the preload force with an equal and opposite one, to minimize wear on bearings and other components of the apparatus.

The first preferred embodiment is described by reference to FIG. 1. In the interest of emphasizing essential geometrical relationships, construction details were omitted from the figure. The kinematic and dynamic relationships between components may be described as follows:

Kinematic Relationships
  i. The rotor, indicated by reference numeral 100, is adapted to rotate freely about an axis of revolution located in fixed relationship with respect to a stator, indicated diagrammatically by reference numeral 102.
  ii. At least a portion of the body of the rotor 100 is substantially configured as a cylindrical shell. Preferably, both the inner and outer surfaces of the shell conform to the conventional definition of cylindrical surfaces, i.e. they may be thought of as being generated by line segments which always remain parallel to the axis of revolution while following inner and outer profile curves, respectively. The profile curves will follow certain reasonable and practical geometric restrictions. Specifically, the profile curves should ideally have the following properties:
   1. Smoothness.
   2. No self-intersection (within a profile curve).
   3. No mutual intersection (between profile curves).
   4. The radius of curvature at any point of one profile curve should be much greater than the distance to the nearest point on the other profile curve.
   5. The inner profile curve will always be closer to the center of rotation than the outer profile curve.
   6. The spacing between the inner and outer profile curves (shell thickness) may vary only slowly and by an amount small compared to the spacing itself.
  iii. The illustrated slope-following drive further includes a motor module 104 having a bounding surface 106 that contacts the rotor 100. The bounding surface 106 is indicated only diagrammatically in FIG. 1. The motor module 104 includes components to be described in more detail with reference to FIGS. 2-5, and in particular includes one component that presents the bounding surface toward the rotor 100. At least one portion of the bounding surface 106 (e.g. at the end of a friction tip of an ultrasonic motor) has a tangential relationship to a point-like region* on the outer cylindrical surface of the rotor 100. Enforcement of the tangential relationship is provided by a pivotable guide 108 equipped with counter rollers, as further described below in relation to FIG. 4.

*A point-like region is defined as a region of extent smaller than any other length scale of interest in the system. To the extent that it differs from a mathematical point, such a difference is inconsequential. For instance, a real surface will have microscopic features consisting of protrusions and depressions with various profiles. Consequently, two components in tangential physical contact may actually have a plurality of contact points distributed on a microscopic scale, while on a macroscopic scale the contact region may be described as point-like.

iv. The locus of potential point-like regions of contact between the rotor 100 and motor module 104 is substantially planar. In a frame of reference fixed with respect to the rotor, this locus may be described as a 2-dimensional curve, named the contact curve, and lying in the contact plane. During the motion of the rotor, the contact point advances along this curve in either of two possible directions. If, and only if, the contact curve is a closed shape, such as a circle or ellipse, the rotor may undergo continuous rotation covering 360° or more.
  v. The contact plane is perpendicular to the axis of rotation of the rotor 100.
  vi. While retaining its tangency relationship to the rotor 100 or shell, the motor module 104 body is constrained to a sliding relationship within the confinement of a pivotable guide 108. When viewed from a frame of reference fixed with respect to the pivotable guide 108, the motor module 104 body slides along a rectilinear path parallel to the contact plane.
  vii. The pivotable guide 108 is adapted to rotate about an axis fixed within the stator support means, and parallel to the rotor rotation axis. In the example of FIG. 1, the axis of rotation of the pivotable guide 108 is positioned on one side of the motor module 104. This, of course is not a limitation, but merely an example. The axis of rotation of the pivotable guide 108 could equally well have been positioned on the other side of the motor body, or somewhere in between.

Dynamic Relationships
  i. The motive force produced by the motor module 104 and received by the rotor 100 causes the contact point between the two to advance along the contact curve (see description above) in either one of two opposite directions.
  ii. Reaction forces are experienced at the rotor 100 and pivotable guide 108 axes and an overall reaction torque is imparted to the stator 102.

The use of "rotor" and "stator" terminology is common and very useful in the art. In the case of the present invention, those terms remain useful but are insufficient to describe the elements of FIG. 1. It will be seen from the description above and the figure that the motor module 104 and its pivotable guide 108 are not part of either the rotor 100 or the stator 102, although they share geometrical relationships with both. This is because the motor module 104 and pivotable guide 108 do not remain stationary; nor do they rotate or translate together with the rotor 100, although their motions are coordinated.

FIGS. 2-5 provide more detail about the arrangement of parts in this embodiment. The motor itself, as notionally depicted in FIG. 2, comprises four distinct elements:

1. An external case 120 defining the direction of motor preload.
2. An energy converter 122. For example, the energy converter 122 could be: (a) for a piezoelectric motor, one or more piezoelectric ceramic wafers with a pattern of electrodes in electrical communication to a controlled supply, using principles well known in the piezoelectric motor art, or (b) a DC electro motor or stepper motor).
3. An output feature 124. For example, the output feature, although not shown in detail, may be: (a) for a piezoelectric motor, a friction nub or tip, typically made of alumina ceramic, (b) a friction-based output wheel in the case of a smooth rotor, or a spur gear, if the rotor is configured as a toothed gear or rack, etc.
4. A passive resilient member 126 for providing a preload between the rotor 100 and motor module 104. The magnitude of the preload should be chosen on the basis of the largest dynamic load anticipated in the application. The larger the expected acceleration, the larger the motor preload should be, in order to maintain both mechanical contact and optimal angular relationship between motor module 104 and moving member (rotor) surface.

Figure 2:
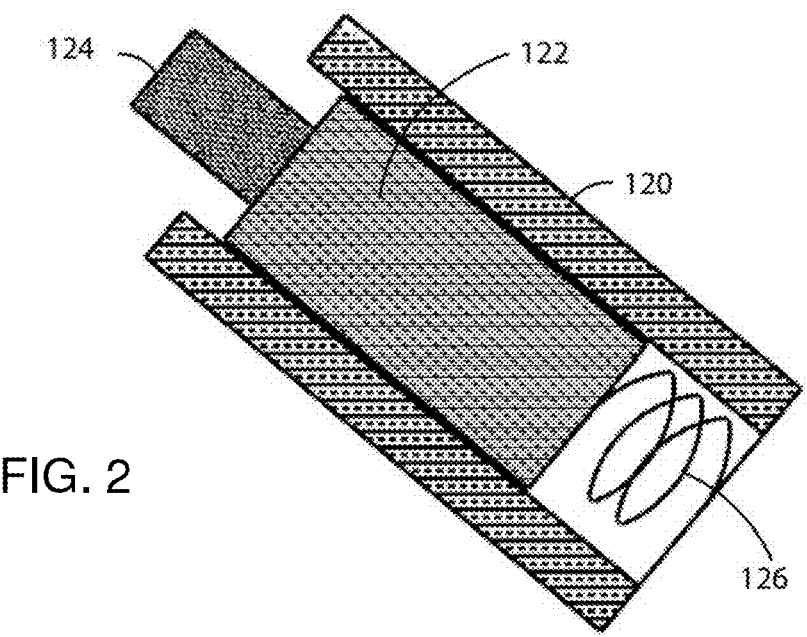
FIG. 2 is a schematic representation of a motor with built-in preload means.
Figure 3:
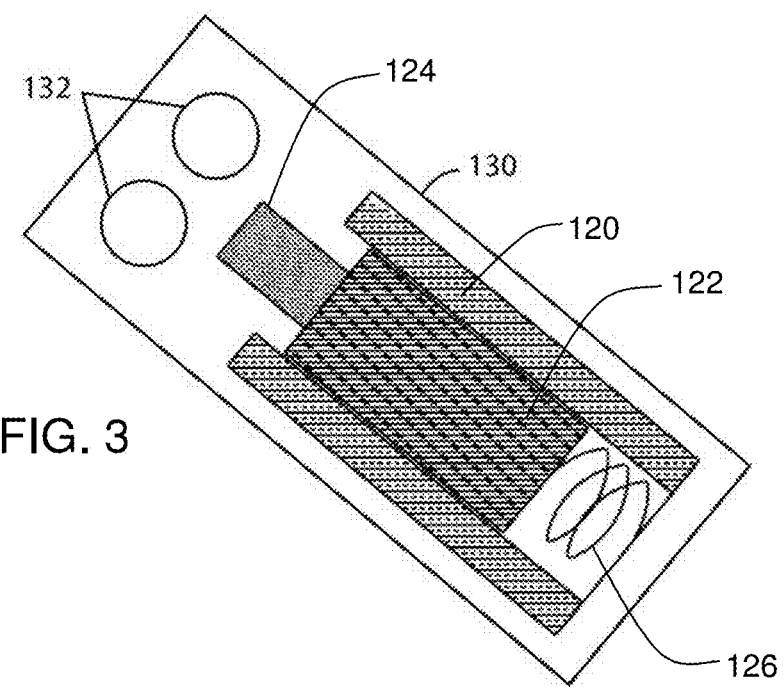
FIG. 3 is a schematic view of the motor of FIG. 2 mounted on a carrier.

The motor shown in FIG. 2 is mounted onto a rigid carrier 130, as shown in FIG. 3, and together the motor and its carrier 130 are the principal components of the motor module 104 of FIG. 1. A key provision of the carrier 130 is the presence of two guide rollers 132. In the figure the rollers 132 are generically indicated by circles, since they are well known in the art, and available in a variety of configurations and materials, the details of which fall outside the scope of the present invention. The axes of the rollers 132 are substantially perpendicular to the main surface of the carrier. The main surface of the carrier has a generally rectangular outline, with its two long sides configured to be substantially straight and parallel to each other.

The locations of the two rollers 132 are preferably selected so that, for the limiting cases of a straight or a circular driven member or rotor 100, the motor module 104, or more precisely the motor output feature 124, is preloaded with respect to the driven member in a substantially perpendicular or radial direction. However, for specific requirements where some angular bias is desired (e.g. dissimilar forward and backward motion), the location of the rollers 132 may be selected differently, without departing from the teachings of this invention. The choice of spacing between the rollers 132 is made on the basis of the following tradeoff considerations:

If a light motor preload force is desired, a relatively large roller spacing should be used, although a smaller range of rotor curvatures could be accepted. If it is desired to accommodate a large range of rotor 100 shell curvatures, a relatively close space between carrier rollers 132 should be chosen, although the motor preload force may be relatively larger.

Figure 4:
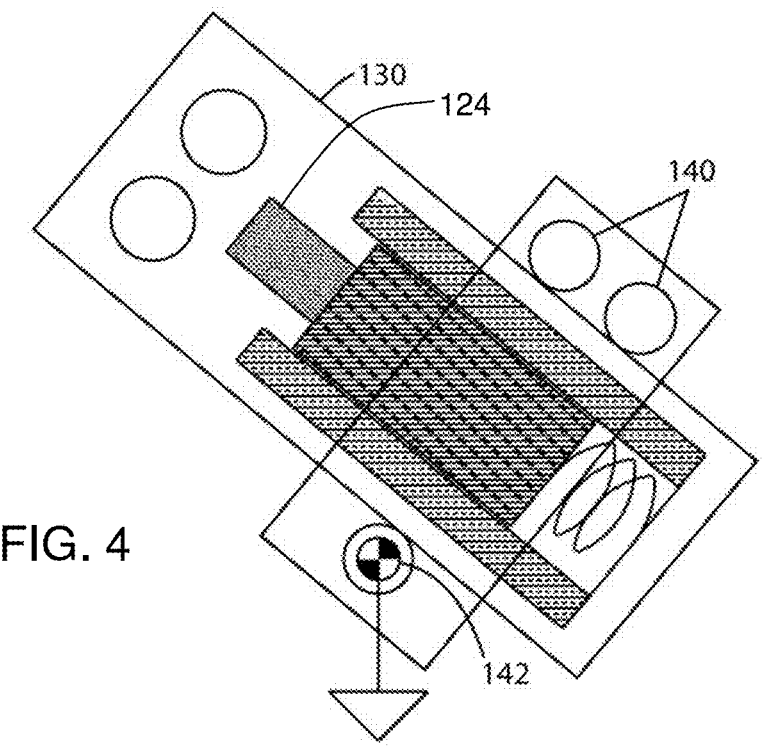
FIG. 4 is a schematic view of the motor and carrier of FIG. 3, with these components mounted in a sliding relationship with a pivotable guide.

The carrier 130 is adapted to be coupled in sliding relationship to the pivotable guide 108. As best shown in FIG. 4, the pivotable guide 108 is constructed as a rigid platform with the following features:

Three rollers, two of which are shown at 140, are integrated onto the pivotable guide 108 platform, thus providing a kinematic definition of the sliding relationship. The two rollers 140 will contact one of the long sides of the motor carrier 130, while a third roller (shown at 142 in FIG. 4) will contact the opposite long side of the motor carrier 130. In order to avoid unreasonably tight tolerances, only two of the rollers (the two shown at 140) have fixed axes of rotation, while the third roller 142 is provided with resilient positioning means (not shown) for its axis, as known in the art. When the motor carrier 130 is engaged by the pivotable guide 108, the third roller 142 is preloaded against one of the long sides of the motor carrier 130, thus removing any slack. If desired, the stiffness of the third roller positioning means may be conveniently chosen to facilitate soft starting and stopping characteristics for the driven member or rotor 100.

The pivotable guide 108 is pivotably coupled to the stator 102 or fixed support. The figure shows the pivoting axis to be in coincidence with the axis of one of the rollers (the third roller 142). Nevertheless, the location of the pivoting axis may be chosen independently, without departing from the scope of the invention.

Figure 5:
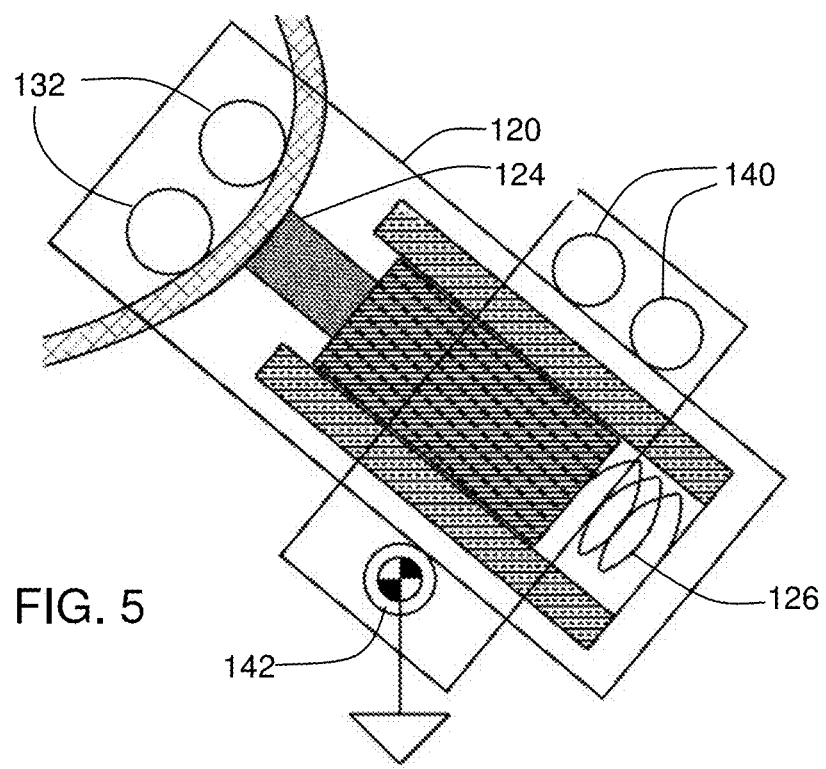
FIG. 5 is a schematic view similar to FIG. 4 and further showing how the motor is coupled to the variable curvature rotor shown in FIG. 1.

Finally, the edge of the rotor 100 or driven member shell is captured in clamping relationship between the single output feature 124 of the motor module 104 and the two rollers 132 of the motor carrier 130, as best shown in FIG. 5. For a given position along the circumference of the roller or along the length of the driven member 100, the two rollers 132 kinematically define a unique orientation of the motor module 104 with respect to the driven shell 100. This orientation can be chosen by design to be at the optimum angle.

Figure 6A:
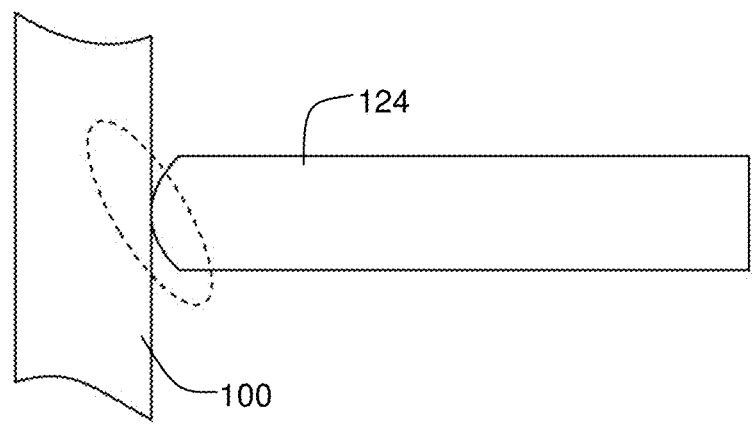
FIG. 6A is a schematic view showing the motor of FIGS. 1-4 in optimal contact with the rotor.
Figure 6B:
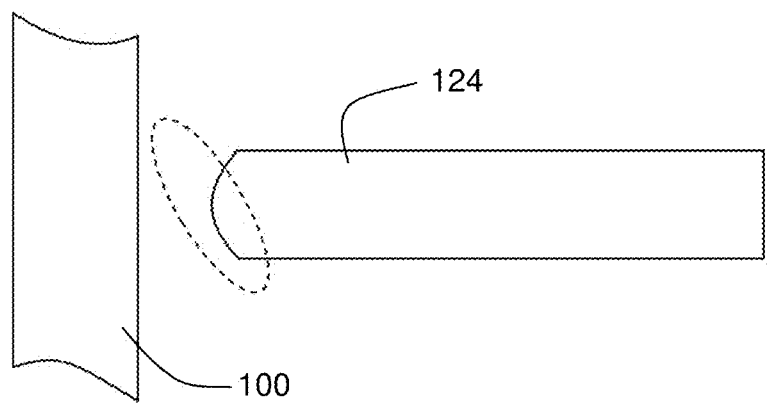
FIG. 6B is a schematic view similar to FIG. 6A but showing a condition of radial position error of the motor with respect to the rotor.
Figure 6C:
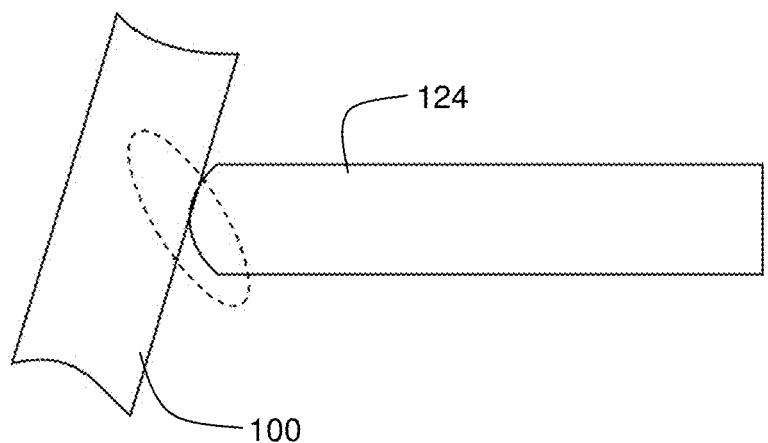
FIG. 6C is a schematic view similar to FIGS. 6A and 6B but showing a condition of angular position error of the motor with respect to the motor.
Figure 9:
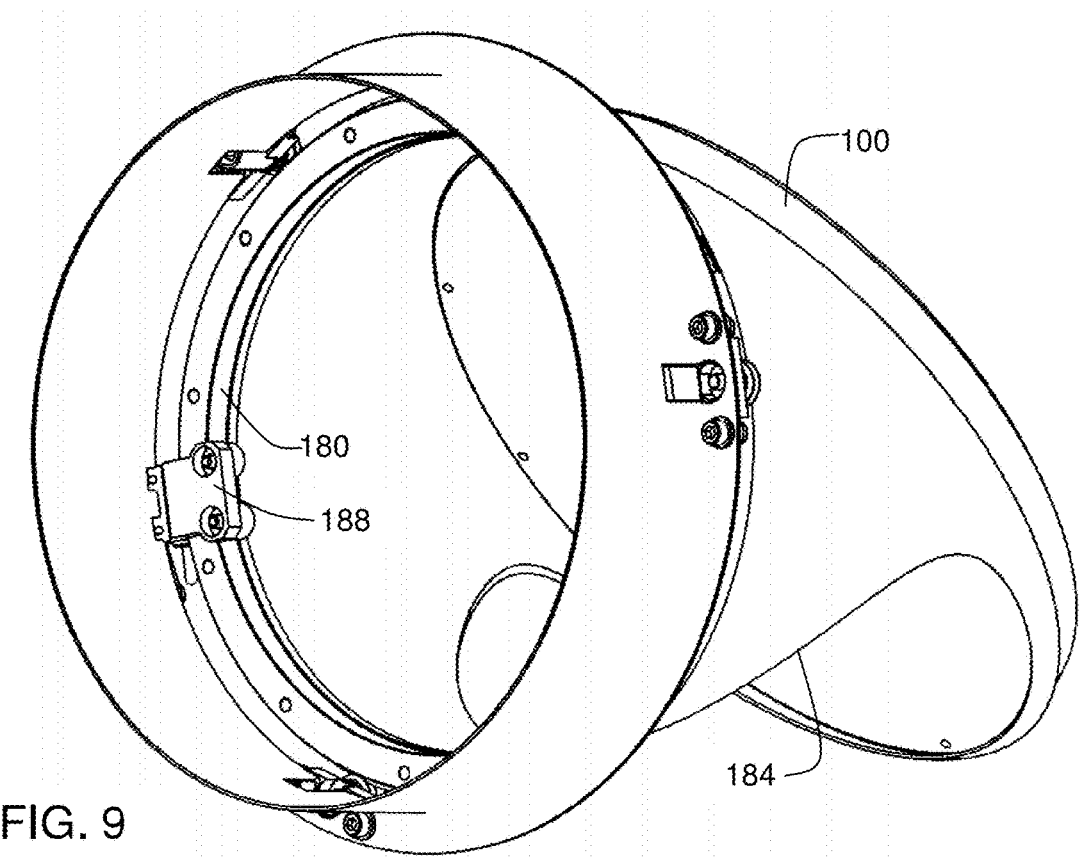
FIG. 9 is an interior perspective view of the optical scanning assembly of FIG. 8.
Figure 10:
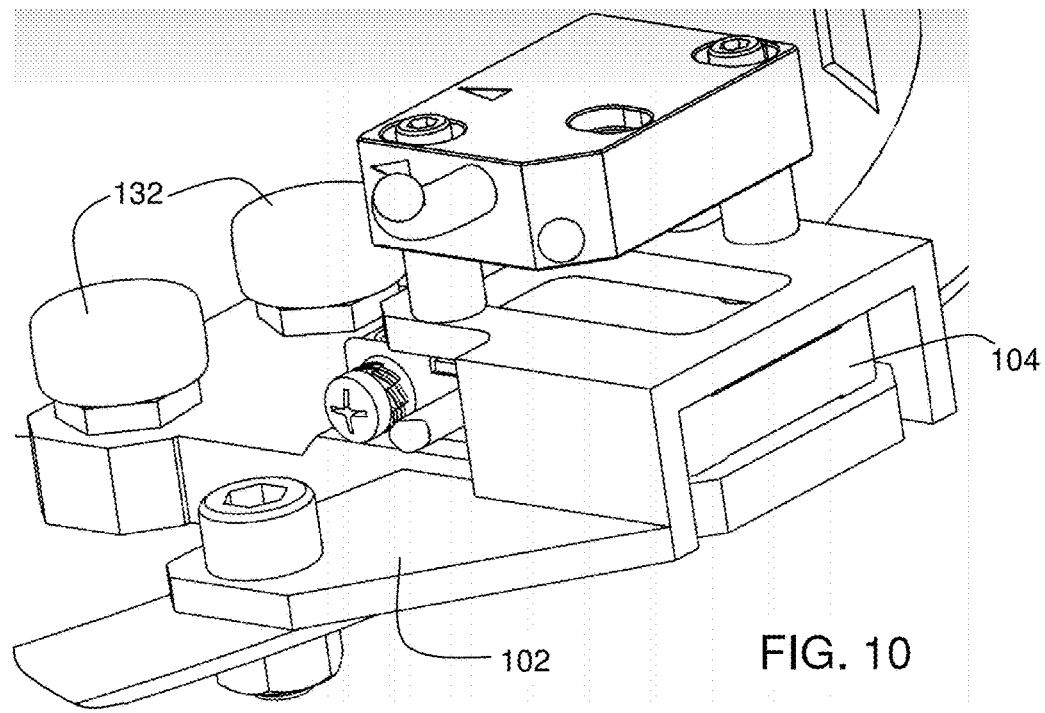
FIGS. 10 and 11 are fragmentary and enlarged perspective views of portions of the optical scanning assembly of FIGS. 8 and 9.
Figure 11:
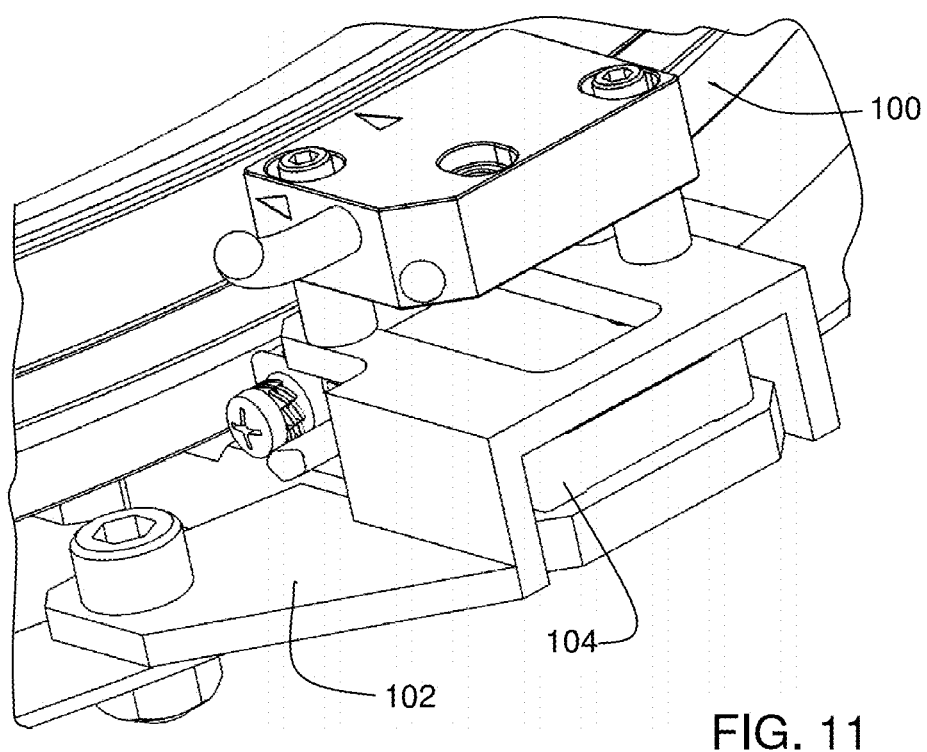

FIGS. 6A, 6B and 6C qualitatively depict the angular and positional relationships that can occur in motor configurations ranging from optimal to inoperative, with particular emphasis on the case of an ultrasonic motor. The dashed ellipse in each of the figures illustrates the vibrational motion of the friction tip that is the output feature 124 of the motor module 104.

FIG. 6A illustrates the ideal case, as would obtain for the present invention. FIG. 6B shows loss of contact between the friction tip 124 and the rotor 100, as might occur when the preload is inadequate or the rotor shell 100 is too far from motor module 104 due to one of the following conditions:

The rotor 100 or shell has manufacturing imperfections.
The rotor 100 or shell has become distorted due to static loading.
The rotor 100 or shell is dynamically distorted due to excessive speed, acceleration or impact.

Even if rotor contact is not lost, but effective contact force is diminished, the motor performance may still suffer, by reducing the maximum acceleration or deceleration capacity. The use of the carrier defined in the present invention would effectively prevent such loss of contact and significantly reduce variation of contact force under all but the most severe disturbances.

FIG. 6C illustrates the case of angular error. A preload may not be sufficient to correct this condition. For instance, a single counter roller coupled to a motor with a single output feature would not sufficiently define the angular relationship between the motor module 104 and rotor 100, because angular error can simply be accommodated by deflecting the motor against its resilient preload means. On the other hand, the two carrier rollers 132 described in relation to the present invention, coupled with a properly chosen motor preload, can effectively prevent angular error under all but the most severe disturbances, such as sudden acceleration or stoppages. The pivotably supported guide 108 of this invention allows the motor to follow the varying slope of a rotor 100 having a non-ideal shape and surface condition.

FIG. 7 depicts the most general case of positional and angular error. Such errors may result in an inoperative or poorly performing motor. Both carrier sliding and guide pivoting degrees of freedom of the motor module 104 are needed, in general, to accommodate the largest range of driven member shapes, as locally manifested by varying radial position and slope of the rotor shell 100. In addition, the motor movement in its case against its preload is the degree of freedom needed to accommodate variations in driven member shell thickness.

A preferred embodiment of the slope-following precision drive mechanism invention is illustrated in FIGS. 8-11 and takes the form of an optical scanning assembly. One application of this embodiment is to redirect the field of view of an optical system such as a telescope according to the intention of the user. Most commonly, a generally cylindrical stator houses a telescope (not shown), whose field of view is deflected at right angles upon reflection from a 45° tilted mirror. Of particular interest is a version of the optical scanning assembly that can be flown on orbiting spacecraft. In such an application, low mass, low power consumption and precise performance are highly desired. Wherever possible in describing these figures, reference numerals corresponding to those used in FIGS. 1-7 are used to identify corresponding components in FIGS. 8-11.

As shown in FIG. 8, the rotor 100 is a shell-like structure that is generally cylindrical or conical in shape and presents a circular opening in one direction, the opening having a circumferential edge rail 180 that is engaged by the motor module 104 (not visible in FIG. 8). The illustrated rotor 100 or shell supports an optical element 182 at an orientation of approximately 45° to the rotational axis of the rotor. The shell 100 also has a scalloped opening 184 to allow light to enter the shell and impinge on the optical element 182. In the embodiment as shown, the optical element 182 may be a mirror that redirects an image through a 90° angle. The invention is not, however, limited to this application and the optical element may take some other form. The embodiment of FIG. 8 also includes three guide wheel assemblies 186, only two of which are visible, for supporting the rotor 100 on its horizontal rotation axis, and a motor and encoder assembly 188 that incorporates the motor module 104 and an encoder (not shown in detail) for determining the angular position of the rotor by sensing markers in an encoding strip (not shown) extending circumferentially around the rotor and using well known technology.

The inventive assembly shown in the FIGS. 8-11 meets the desired requirements of low mass, low power consumption and precise performance in the following ways:

The rotor and stator are constructed from strong but light weight carbon fiber composites.

The optical element is of light weighted construction achieved using a system of stiffening ribs or webs supporting, if the element is a mirror, a high quality reflective low expansion glass sheet.

A light weight edge rail is attached to one end of the cylindrical rotor 100 and serves three purposes: (1) It supports the rotor by engaging the set of three guide wheel assemblies 186 mounted to the stator 102. (2) It is coupled to the slope-following precision drive as described in the first preferred embodiment described above with reference to FIGS. 1-7. (3) It forms a platform on which an encoder scale is mounted for precisely measuring the rotor position.

A motor and encoder assembly, wherein the motor is of the slope-following drive type described above.

Rotor bearing means consisting of a system of three guide wheel assemblies 186 mounted on the stator 102 and supporting the edge rail 180 of the rotor 100 in a rolling contact relationship.

The use of the slope-following drive motor of the present invention is very advantageous, especially for a space-based application. It allows the edge rail 180 to be made from common light weight materials such as aluminum, using ordinary machining processes without fear that the resulting shape might hinder or prevent operation of the motor. For example, commercially available ultrasonic motors normally require the use of relatively expensive driven members, which are typically manufactured from finely machined and polished materials such as alumina ceramics. The reason for such stringent requirements is that such motors rely on very small, but highly controllable rapid vibrations. In order for the motion to be predictably controlled, the rotor or driven member is normally constructed as a linear or rotary stage with carefully designed and tightly toleranced components. As discussed above, incorporating such a motor into the slope-following drive of the present invention, allows the motor to operate in the well controlled local environment it needs, while relieving the global shape of the driven element from its tightest requirements. Any deviations of the edge rail from roundness are easily accommodated. At the same time the edge rail is able to carry any convenient encoder scale, thus providing excellent feedback to the motor controller and achieving highly precise motion. Although encoding solutions, such as optical scales, with very fine submicron resolution are available and can be used to control an ultrasonic motor, even an inexpensive magnetic scale with micron level resolution can lead to highly precise movement. For example, the rotation of an optical assembly corresponding to one micron of circumferential travel is less than 2 arc seconds for a 10-inch diameter edge rail.

In the embodiment shown in FIGS. 8-11 a read head is integrated into the same assembly (188) as the motor module 104. However, the encoder may be mounted in other convenient configurations without departing from the scope of the invention.

The guide wheel assemblies 186 are preferably built using wheels with a V-shaped cross-sectional profile and engage a complimentary shape in the edge rail 180. Nevertheless, other bearing types, such as using bearing stiles, may be substituted while still following the present inventive concepts.

Although motor carrier 130 of the slope-following drive was described (see FIG. 3) as sliding with respect to the pivotable guide 108 while in contact with its rollers 140, 142, (See FIG. 4) the sliding capability can be implemented differently without departing from the inventive concept presented. In particular, the embodiment depicted in FIGS. 8-11 uses a pivoting guide design without rollers. In this implementation, the motor carrier 130 simply slides in a channel built into the pivotable guide 108 with the correct tolerance to permit moderate friction during sliding. The pivotable guide 108, however, still requires the use of its two rollers 140.

It will also be appreciated that although the present invention has been described and illustrated in detail by way of example, various modifications may be made without departing from the spirit and scope of the invention. Accordingly, the invention should not be limited except as by the appended claims.

The invention claimed is:

1. A slope-following drive apparatus for precisely moving a driven member as desired while minimizing net forces, other than driving forces, applied to the driven member, the apparatus comprising:
    a driven member having a driven surface;
    a motor assembly including a motor for imparting a driving force to the driven surface in a generally tangential direction;
    a coupling mechanism for coupling the motor assembly to the driven surface in such a manner as to minimize net preload forces applied to the driven member and the motor assembly; and
    a stator to which the driven member is mounted in a manner permitting desired movement with respect to the stator, and to which the motor assembly is mounted in a manner permitting movement that allows the motor assembly to adapt to irregularities in the driven surface.

2. A slope-following drive apparatus as defined in claim 1, wherein:
    the motor includes an output feature capable of delivering a transverse force for driving the driven member; and
    the motor assembly includes means for resiliently urging the motor output feature into contact with the driven surface by application of a preselected preload force.

3. A slope-following drive apparatus as defined in claim 1, wherein:
    the driven member is generally cylindrical;
    the driven surface is a generally circular rim on the driven member; and
    the coupling mechanism includes resilient means for urging the motor by radial force into driving contact with one face of the circular rim, and at least one roller that resists the radial force and thereby minimizes any net force applied to the driven member by the motor.

4. A slope-following drive apparatus for precisely moving a driven member as desired while minimizing net forces, other than driving forces, applied to the driven member, the apparatus comprising:
    a driven member having a driven surface;
    a motor assembly including a motor for imparting a driving force to the driven surface in a generally tangential direction;
    a coupling mechanism for coupling the motor assembly to the driven surface in such a manner as to minimize net preload forces applied to the driven member and the motor assembly; and
    a stator to which the driven member is mounted in a manner permitting desired movement with respect to the stator, and to which the motor assembly is mounted in a manner permitting movement that allows the motor assembly to adapt to irregularities in the driven surface;
    wherein the motor assembly further comprises a carrier assembly to which the motor is rigidly mounted, and a guide assembly rigidly mounted on the stator and to which the carrier assembly is mounted for limited sliding movement in a direction normal to the driven surface, whereby the guide assembly, and with it the carrier assembly and motor, has freedom for limited motion in the direction normal to the driven surface, to facilitate adaption of the motor assembly to slope and other irregularities in the driven surface.

5. A slope-following drive apparatus as defined in claim 4, wherein:
    the motor includes an output feature capable of delivering a transverse force for driving the driven member; and
    the motor assembly includes means for resiliently urging the motor output feature into contact with the driven surface by application of a preselected preload force.

6. A slope-following drive apparatus as defined in claim 4, wherein:
    the driven member is generally cylindrical;
    the driven surface is a generally circular rim on the driven member; and
    the coupling mechanism includes resilient means for urging the motor by radial force into driving contact with one face of the circular rim, and at least one roller that resists the radial force and thereby minimizes any net force applied to the driven member by the motor.

* * * * *